C. BJORKLUND.
BARREL TRUCK.
APPLICATION FILED MAR. 9, 1909.
957,840.
Patented May 10, 1910.
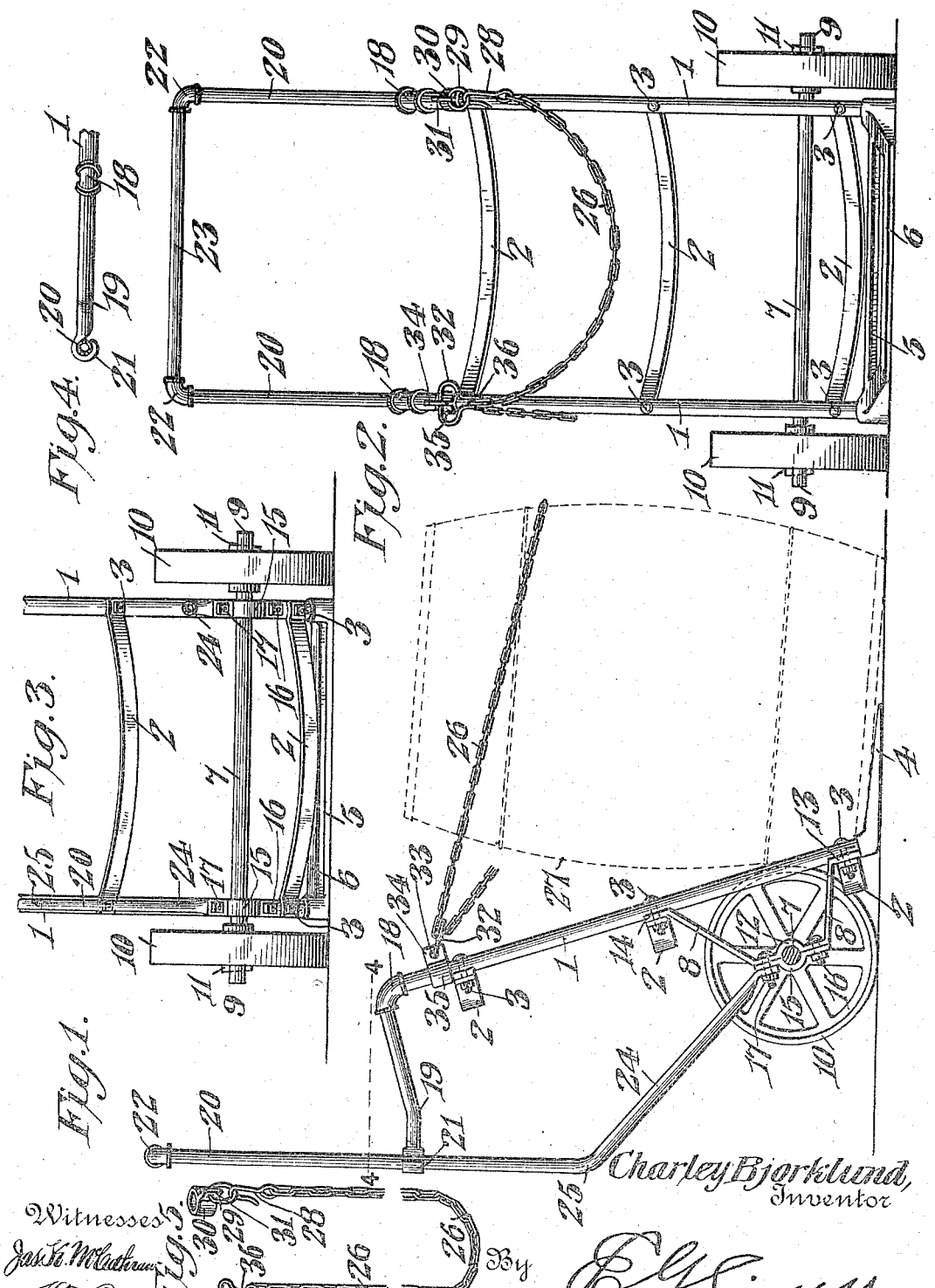
Charley Bjorklund,
Inventor
Witnesses
By
Attorney

UNITED STATES PATENT OFFICE.

CHARLEY BJORKLUND, OF BOWESMONT, NORTH DAKOTA, ASSIGNOR OF ONE-THIRD TO H. M. WALDREN AND ONE-THIRD TO JOHN V. ANDERSON, OF DRAYTON, NORTH DAKOTA.

BARREL-TRUCK.

957,840.   Specification of Letters Patent.   Patented May 10, 1910.

Application filed March 9, 1909. Serial No. 482,371.

*To all whom it may concern:*

Be it known that I, CHARLEY BJORKLUND, a citizen of the United States, residing at Bowesmont, in the county of Pembina and State of North Dakota, have invented a new and useful Barrel-Truck, of which the following is a specification.

The invention relates to improvements in barrel trucks.

The object of the present invention is to improve the construction of barrel trucks, and to provide a simple and comparatively inexpensive barrel truck of great strength and durability, equipped with high wheels adapted without liability of coming in contact with a barrel to cause the truck to run more easily, and capable of enabling a heavy load to be more conveniently handled.

A further object of the invention is to provide a truck of this character, adapted to afford a firm and steady support for a barrel to prevent the same from slipping laterally off the truck, and capable of enabling a load to be readily balanced over the axle and of preventing the center of gravity of the load from being thrown too far rearward, when the handle of the truck is let down upon the floor, so that the truck may be readily lifted therefrom when it is desired to move the load.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a side elevation, partly in section, of a barrel truck, constructed in accordance with this invention. Fig. 2 is a front elevation of the same. Fig. 3 is a rear elevation of a portion of the truck, the handle frame being broken away at one side. Fig. 4 is a detail sectional view on the line 4—4 of Fig. 1. Fig. 5 is a detail perspective view of the chain attachment.

Like numerals of reference designate corresponding parts in all the figures of the drawing.

The barrel truck, which is largely constructed of tubular steel to secure the requisite strength and at the same time render the truck light and easy to handle, comprises in its construction tubular side bars 1, connected by transverse supporting bars 2, curved to conform to the configuration of the barrel and secured by bolts 3, or other suitable fastening devices to the tubular side bars at the lower faces thereof. The side bars and the transverse bars constitute a load-supporting frame, and the curvature of the transversely disposed supporting bars enable a barrel to set in between the side bars and provide a firm and steady support for the load to prevent the same from slipping laterally off the truck. The truck is provided at the front with a metal foot piece 4, tapered in thickness, as shown, to enable it to be readily introduced beneath a barrel and composed of forwardly converging sides and transverse connecting portions 5 and 6, the sides being suitably secured at their inner ends to the front terminals of the tubular side bars 1.

The truck is equipped with a straight transverse axle 7, secured to brackets 8 and provided with terminal spindle portions 9, receiving wheels 10 retained on the spindle portions of the axle by means of keys 11, or other suitable fastening means. The brackets, which depend from the side bars 1, are composed of front and rear inclined portions and longitudinal bottom connecting portions 12. The upper terminals 13 and 14 of the inclined portions are secured to the side bars by the bolts 3, which fasten the adjacent supporting bars 2 to the side bars. The bottom portion 12 of the bracket is curved at the center to fit the upper portion of the axle 7, which is round, and the axle is secured to the brackets by means of the lower bearing members 15, curved at the center to fit the lower face of the axle and secured by front and rear bolts 16 and 17 to the depending brackets. By this construction the truck is equipped with comparatively high wheels, which enables the truck to run easily and to be easily handled without the load coming in contact with the wheels.

The rear ends of the side bars 1 are connected by elbow couplings 18 with legs 19, constructed of tubular metal and connected at their lower ends with handle bars 20 of a handle frame. The lower terminals 21 of the legs 19 are flattened and curved to form cuffs for embracing the handle bars, but they may be connected with the same by couplings, or any other suitable means, as will be readily understood. The handle bars 20, which extend longitudinally of the truck, are connected at their rear ends by elbow couplings 22 with a transverse handle 23, and they are provided with front angularly related portions 24, arranged at an obtuse angle to the rear portions of the handle bars, and secured to the brackets by the rear bolts 17 thereof. The angles 25 of the handle bars contact with the floor, or other supporting surface and coöperate with the wheels in supporting the truck when the latter is arranged in a horizontal position. This construction first elevates the rear portion of the truck and throws the center of gravity of the load forward, and at the same time arranges the rear portions of the handle bars at an inclination, so that the handle 23 is located above the floor or supporting surface so that it may be readily grasped. By throwing the center of gravity of the load forward, the truck is more easily raised from the floor when it is desired to move the load.

The truck is equipped with a chain attachment consisting of a chain 26, adapted to be passed around a barrel 27 and connected with the side bars of the frame of the truck, as illustrated in Fig. 1 of the drawing, to enable the frame of the truck to be utilized as a lever for tilting a heavy barrel onto the truck. The chain is provided at one end with a hook 28 for detachably engaging a ring 29, carried by a cuff 30, loosely mounted on one of the side bars of the frame of the truck, as clearly illustrated in Fig. 2 of the drawing. The cuff is provided with a projection or lug 31 having a perforation into which the ring 29 is linked. The chain is adjustably connected with the other side bar of the frame by means of a chain grab 32, linked into a perforation 33 of a lug or flange 34 of a cuff 35, which is loosely arranged on the side bar of the frame of the truck. The flanges or projections of the cuffs may be conveniently formed by extending the terminals of the metal outward, and the chain grab consists of a link having an enlarged portion and a contracted portion 36, adapted to receive a link of the chain edgewise so as to be engaged by the contiguous outer link. The links of the chain are straight and are arranged in planes at right angles to each other so that when one link is fitted in the contracted portion of the chain grab, the next link will serve as a stop. The chain is adapted to be readily passed through the enlarged portion of the chain grab, and any portion of it may be readily carried into engagement with the contracted engaging portion of the chain grab. After a barrel has been tilted onto the truck, the chain may, if desired, be tightened and utilized for securing the barrel in position on the truck.

Having thus fully described my invention, what I claim as new and desire to secure by Letters Patent, is:—

1. A truck of the class described including side bars, transverse supporting bars connecting the side bars, wheels located at the front portions of the side bars, legs extending downwardly from the rear portion of the side bars, and a handle frame adapted to rest upon the floor and extending in rear of the side bars and connected at an intermediate point with the lower ends of the legs and at the front with the truck in advance of the said legs, said handle frame having angularly related front and rear portions.

2. A truck of the class described including side bars, transverse supporting bars connecting the side bars, wheels located at the front portions of the side bars, legs extending downward from the rear portions of the side bars, and a handle frame extending in rear of the side bars and connected at an intermediate point with the legs and at the front with the truck in advance of the said legs and adapted to rest upon the floor or supporting surface, said handle frame being angularly bent in advance of the legs, the angles formed by the bends being arranged to rest upon the floor or supporting surface, whereby the center of gravity of a load is thrown forward and the rear portion of the handle frame elevated.

3. A truck of the class described including a supporting frame, legs depending from the rear ends of the supporting frame, brackets extending downward from the front portion of the supporting frame, an axle provided with wheels and secured to the brackets, and a handle frame also secured to the brackets and connected at an intermediate point with the lower ends of the legs and extended beyond the supporting frame, and adapted to rest upon the supporting surface.

4. A truck of the class described including a supporting frame, legs depending from the rear ends of the supporting frame, brackets extending downward from the front portion of the supporting frame, an axle provided with wheels and secured to the brackets, and a handle frame also secured to the brackets and connected at an intermediate point with the legs and extended beyond the supporting frame, said handle frame being angularly bent at a point between the legs and the brackets, and the bends being arranged to rest upon the supporting surface to elevate the rear portion of the truck and to throw the center of gravity of the load forward.

5. A truck of the class described including side bars, transverse connecting bars, brackets secured to the side bars at the front portions thereof and composed of inclined sides and a bottom connecting portion, the latter being bent at an intermediate point, lower bearing members secured to the brackets and correspondingly bent, an axle secured to the brackets by the lower bearing members and arranged between the said bends, legs extending downward from the rear ends of the side bars, a foot connecting the front ends of the side bars, and a handle frame having opposite longitudinal handle bars secured at their front ends to the brackets and connected at an intermediate point to the legs and extended in rear of the side bars.

6. A truck provided with a chain attachment including cuffs embracing the opposite sides of the truck and having projecting portions provided with openings, a chain provided at one end with a hook, a chain grab link arranged in one of the openings of the said projections and consisting of an enlarged portion adapted to permit the chain to pass through it, and a contracted portion of a size to permit a link of the chain to be arranged edgewise in it, and a ring mounted in the opening of the other projection for detachable engagement with the chain hook.

In testimony, that I claim the foregoing as my own, I have hereto affixed my signature in the presence of two witnesses.

CHAS. BJORKLUND.

Witnesses:
RALPH C. SOWLE,
B. W. THOMSON.